Jan. 15, 1963 H. R. WIANT 3,073,759
SELECTIVE PLATING PROCESS
Filed Aug. 10, 1959

HERMAN R. WIANT
INVENTOR.

BY
ATTORNEYS.

United States Patent Office 3,073,759
Patented Jan. 15, 1963

3,073,759
SELECTIVE PLATING PROCESS
Herman R. Wiant, Beverly, Mass., assignor to Avco Corporation, Cincinnati, Ohio, a corporation of Delaware
Filed Aug. 10, 1959, Ser. No. 832,550
10 Claims. (Cl. 204—15)

The present invention relates to a process for selectively plating objects and more specifically to a process for electrodepositing metal on selected areas of honeycomb core.

Of growing importance in aviation are brazed honeycomb reinforced panels, particularly those made of stainless steel. Panels of this type are being widely used today in advanced type aircraft since their strength-to-weight ratio is higher than conventional structures used heretofore. Such panels generally comprise a sheet metal core of honeycomb configuration brazed to side sheets having smooth exterior surfaces.

During manufacture of honeycomb reinforced panels brazing alloy is usually placed directly between the faces of the honeycomb core and the adjacent faces of the side sheets to be joined to the core. The brazing alloy may conveniently be provided in the form of a thin foil. The panel, when assembled with the brazing alloy in place, is raised in temperature until the alloy melts and joins the components together. Part of the success of such panels is due to the fact that under ideal conditions the brazing alloy forms rounded fillets between the adjacent portions of the core and the side sheets. These fillets provide strength and, by virtue of their configuration, bond to a substantial area of both members being joined.

Unfortunately, it has been found difficult in practice to obtain good fillet formation, particularly in the manufacturing of stainless steel panels. Stainless steel is not very receptive to certain brazing alloys. Such alloys have difficulty wetting it even at brazing temperatures. Through extensive work with such panels it has been learned that a sterling silver alloy having .2% lithium will wet the stainless steel satisfactorily. The lithium acts as a surface deoxidizer and flux for the sterling silver. Since it promotes excellent wetting, it also promotes excessive flow of the brazing alloy. This is pronounced at the nodes of the core (joints of the sheet metal from which the core is made) where flow of brazing alloy is enhanced by capillary action. There results an undesirable condition called "node flow" which consists of complete wetting of the nodes of the honeycomb core, permitting flow of brazing alloy from one side of the core to the other. When this happens only small brazing fillets are formed at the top of the core and much larger ones form at the lower side of the core where it is joined to the lower side sheet. If a curved, or other than a flat panel, is being brazed, "flooding" may result. This consists of drainage of fluid brazing alloy to the lowest portion of the panel where it collects.

Not only does excessive and uncontrolled flow of brazing alloy rob the joints of brazing material but an excessive amount of brazing alloy must also be used to form joints of sufficient strength. This results in a cost increase and a finished panel of increased weight because of the excess brazing material that has been used. In today's large aircraft, the weight increase may be substantial, in the order of 1500 pounds or more per airplane.

When node flow occurs, the nodes themselves become coated with brazing alloy. This increases the heat path from one side sheet to another. Where heat transfer can be detrimental, as in fuel storage tanks, panels characterized by node flow are undesirable.

The present invention makes it possible to avoid all of these difficulties and to manufacture a panel having uniform fillets at the joints between the core and side sheets. The invention completely eliminates the problems of node flow and flooding.

Briefly described, the present invention comprises a process for selectively plating the edge portions of the core which are to be joined by brazing alloy to the side sheets of the panel. More particularly the novel process comprises copper plating the entire core and then applying mastic to the portions of the core where the plating is to be retained. The core may then be stripped of plating except for that portion covered by the mastic. After the stripping operation, the mastic may be peeled off of the core, exposing its copper plated edges.

Although sterling silver brazing alloy (without lithium) wets stainless steel poorly, it readily flows along a copper plated surface. Accordingly, it is possible to take a selectively plated core and braze it to side sheets that have been copper plated, using an alloy without flux addition. In conventional manner, the components of panel are heated to brazing temperature until the alloy flows along the copper plated surfaces. Because only a selected edge portion of the core is plated, however, the alloy has no tendency to flow across the unplated stainless steel mid-portion of the core. In fact the alloy, without the flux addition, is resistant to flowing across the stainless steel. As a result, the brazing alloy forms uniform fillets along the edges being joined. Not only do superior fillets result but a minimum of brazing material is necessary, none being wasted in node flow and flooding.

In view of the foregoing, it will be apparent that it is broadly an object of this invention to provide an improved method of selectively plating objects, particularly honeycomb core.

Another object of the invention is to provide a method of temporarily masking a plated surface with a strippable mastic that may be readily removed after exposed plating has been removed from the object.

A more specific object of the invention is to provide a process for producing honeycomb core that will eliminate node flow and flooding when assembled in a honeycomb panel.

It is also an object of the invention to provide a method of producing an improved core than can be joined to adjacent members with a minimum of brazing alloy.

It is a general object of the invention to provide a method of making a core than can be brazed to other members under less exacting brazing conditions than were formerly required.

The novel features that I consider characteristic of my invention are set forth in the appended claims; the invention itself, however, together with additional objects and advantages thereof, will best be understood from the following description of a specific embodiment when read in conjunction with the accompanying drawings, in which:

Figure 1:
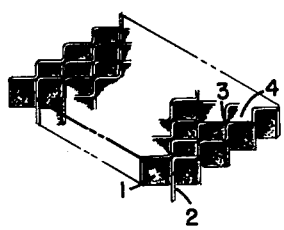
FIGURE 1 is a perspective view of a piece of honeycomb core.

Honeycomb core is so common today that it requires little explanation. As indicated in FIGURE 1, it comprises corrugated strips 1 and 2 of metal which are joined along nodes, indicated at 3. When assembled, the strips define a plurality of cells 4 which may have any desired shape but most often are rectangular or hexagonal in cross section.

Although honeycomb panels have been made from many different materials, application in high speed aircraft dictate the use of stainless steel. Although the type of stainless steel in no way constitutes a limitation of he invention, for purposes of illustration, it may be assumed that the invention is applied to a stainless steel of the precipitation hardening type, such as PH 15-7 Mo, Aeronautical Material Specification No. 5520A. The composition of PH 15-7 Mo as given in "Armco Precipitation Hardening Stainless Steels Technical Data Manual," PH 15-7 Mo, Flat Rolled 0-2-1, March 1, 1958, is carbon 0.09% maximum, manganese, 1.00% maximum, phosphorous 0.04% maximum, sulphur 0.04% maximum, silicon 1.00% maximum, chromium 14.00-16.00%, nickel 6.50-7.75%, molybdenum 2.00-3.00%, aluminum 0.75-1.50%, the balance of the composition being composed of iron.

In carrying out the invention the core is completely plated with copper. By way of illustration, but not limitation, the preferred plating method will be described. The core is first electrically cleaned in an alkaline bath. Following a water rinse, the core is then acid dipped in a dilute solution of hydrochloric acid. Following another water rinse, the core is subjected to anodic acid activation, and then cathodic acid activation, in dilute sulfuric acid. During such activation, a current density of 100-200 amps per square foot of plating area is maintained. After activation, the core is given an acid copper strike and then is copper plated in a sulfate bath at 50 amps per square foot of plating area.

The thickness of the finished plate is relatively unimportant except to the extent that the copper enters into the brazing alloy as a filler and determines its final composition, as will be explained. A thickness in the order of 0.0001 inch has been found satisfactory.

Figure 2:
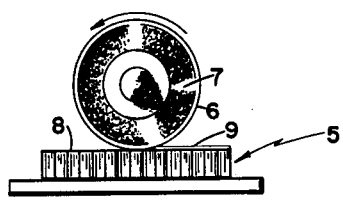
FIGURE 2 is a diagrammatic elevational view of a piece of honeycomb core to which mastic is being applied by means of a roller.

The core, generally designated 5 in FIGURE 2, has been completely copper plated. In the process step depicted by FIGURE 2, mastic 6 is being transferred from the surface of roller 7 to the top surface 8 of the core. The resulting layer of mastic is shown adhering to the surface of the core at 9. It should be understood that the mastic adheres to the edge portions of the core without sealing the core and only penetrates into the cells for a relatively small distance, such as .030-.050 inch.

A water soluble mastic has been found satisfactory. This material in its plastic form readily adheres to the edges of the core and rapidly dries in warm air (about 125° F.) to form mildly adherent rubbery coating. Temperature control is not critical, and the mastic only takes a few minutes to dry. It has been found desirable, although not necessary, to apply the mastic as several thin coats on top of one another, rather than as one heavy coating. In this way a more uniform application is assured. After four or five coats, a surface layer about .020-.040 inch thick is formed on the core and the mastic is allowed to dry thoroughly.

Any mastic that may be removed from the core may be used. Such mastics generally are filled plasticised polyvinyl chloride in a methyl ethyl ketone solvent. Other synthetic resin formulations may be used if desired, such as, for example, the synthetic resin formulations the preparation of which is described in U.S. Patent No. 2,680,724, issued June 8, 1954.

Figure 3:
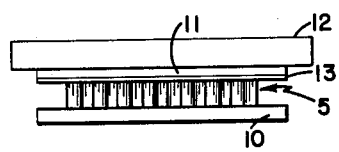
FIGURE 3 is a diagrammatic elevational view of a piece of core to which mastic is being applied by means of a flat pad.

An alternate method of applying the mastic is shown in FIGURE 3. Here the core 5 rests on a support 10. A rubber pad 11, attached to a rigid plate 12, is coated with mastic 13 before being pressed on top of the core. After each application of mastic to the core, the surface of the pad may again be coated with more mastic before it is again pressed against the core. Again, the mastic does not seal the core; for small scale operations, this has been found a particularly effective way of applying the mastic.

Figure 4:
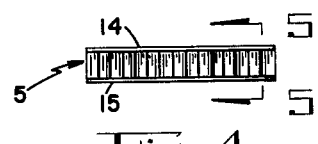
FIGURE 4 is an edge view of a piece of honeycomb core, both faces of which have been coated with mastic.
Figure 5:
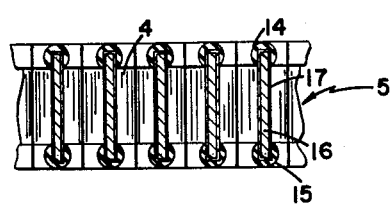
FIGURE 5 is an enlarged cross sectional view of the mastic coated core taken on plane 5—5 of FIGURE 4.

Shown in FIGURE 4 is the core with layers of mastic 14 and 15 adhering to its upper and lower surfaces. In the interest of clarity, the core is shown in cross section in FIGURE 5. This clearly discloses the walls 16 of the core with copper plating, as at 17. Also evident is the mastic coating at 14 and 15. It is noteworthy that the mastic not only coats the edge faces of the core but also penetrates the cells slightly without sealing them so that a small amount of copper plating on the inside surfaces of the cells is protected.

During the next step of the process, the core, with mastic adhering to its edges, is stripped of copper plating, exposing the stainless steel wherever the plating has not been masked. That is to say, the area of the core between the masked edges is stripped of copper plating since the cells are not sealed, the plating beneath the mastic being protected during such operation so that it is not removed.

The method of stripping the copper plating is not critical. One conventional way of accomplishing it is to immerse the core with the mastic adhering to its edges into a 50% $HNO_3$-50% $H_2O$ solution until all exposed copper is etched away. The action of the acid solution on the exposed stainless steel is such as to passivate the steel and further diminish the wettability of this base material. It is important to note that the stripping solution does not attack the mastic and hence is unable to penetrate to the plated area that it protects.

Figure 6:
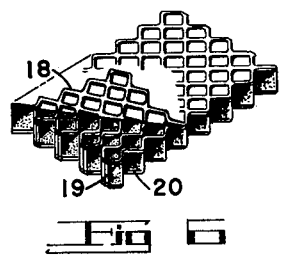
FIGURE 6 is a perspective view of the honeycomb core as it appears as the mastic is being peeled from one of its faces.

After stripping, the mastic is removed. This is shown in FIGURE 6 where the mastic 18 is being gradually peeled from the top of the core, the mastic already having been removed from the bottom surface. The mastic readily peels from the core. It has sufficient inherent strength to hold together and comes off the core as an elastic network. No trace of the mastic will be found on the core after it is peeled.

Figure 7:
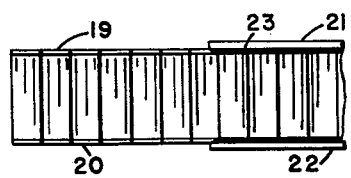
FIGURE 7 is an enlarged edge view of the selectively plated core, a portion of the view showing how brazing alloy forms fillets between the core and side sheets of the finished panel.

Shown in FIGURE 7 is the core with copper plated edge portions 19 and 20. It will be noted that the plating is distributed as a narrow uniform band at the top and bottom of the core.

As mentioned earlier in the specification, it is desirable to braze the selectively plated core to side sheets with a sterling silver brazing alloy not having any lithium addition. This prevents node flow and flooding, as has been explained. Since the side sheets, shown at 21 and 22 in FIGURE 7, are also made of stainless steel, it follows that they must also be copper plated in order to promote wetting by the sterling silver alloy during brazing. Since the steps of plating the side sheets and their assembly to the core constitute no part of the present invention, details need not be given. It is sufficient to understand that the side sheets may be copper plated in essentially the same manner as the core.

The amount of copper on the core and side sheets must be taken into account in determining the final composition of the brazing alloy. Assuming that both core and side sheets have been copper plated to a thickness of 0.0001 inch, addition of a 0.0011 inch thick layer of "fine" silver (in the form of foil between the parts being joined) results in the formation of a sterling silver brazing alloy when the silver is alloyed with the copper. Obviously as more copper is added in the form of plating, more is present in the final alloy composition. A composition lying between coin silver (90% silver-10% copper) and sterling silver (92.5% silver and 7.5% copper) is convenient to use.

FIGURE 7 shows the side sheets 21 and 22 brazed to the core by alloy 23. It will be noted that the fillets formed by the alloy are uniformly distributed and that no brazing alloy has wet the unplated central portion of the core. Node flow and flooding have been completely eliminated and effective use of the alloy guaranteed.

Because panels may be brazed so much more easily through use of the present invention, it is possible to effect brazing under less critical conditions than were formerly required. For instance, the time-temperature factors in the brazing temperature range are less critical, and the need for surgically cleaning components to be joined is avoided. Since the brazing alloy readily wets and bonds to the copper plating, need for extreme precautions in providing a nonoxidizing atmosphere is eliminated.

Athough the invention has been described with particular reference to the use of copper plating, it should be understood that it may be practiced with other coatings and plating materials on objects other than honeycomb core. In the case of honeycomb panel fabrication, the plating could be silver and the brazing material added to the assembly would naturally be copper if a sterling silver brazing alloy were to be formed.

In view of the foregoing, it will be readily apparent that by means of the present invention a novel method of selectively plating an article, particularly honeycomb core, is provided. In the manufacture of honeycomb reinforced panels, use of the product resulting from this novel process will markedly improve the quality of the panel and reduce manufacturing costs.

Having described a preferred method of carrying out my invention, I claim:

1. The method of producing honeycomb core having bands of metallic plating around the edges of the walls defining the honeycomb cells of the core comprising plating the entire core including the interior of the cells with metal, applying successive coats of fluent plastic to both edges of the walls defining the cells without sealing said cells, sufficient mastic being applied to penetrate the cells so that the interior surfaces immediately adjacent the coated edges are also coated, drying the mastic between each successive application until a pliable solid web is formed, chemically stripping the metallic plating from the surfaces of the cells intermediate the mastic coated surfaces, and peeling the mastic as a flexible web from both surfaces of the core whereby bands of plating remain bounding the edges of the cell-defining walls.

2. A method of plating selected areas of honeycomb core having walls defining a plurality of honeycomb cells which comprises electroplating the entire surface of the core with copper, applying a coat of fluent mastic to the edges of the walls defining the cells without sealing said cells, the mastic flowing into the cells sufficiently to coat the surfaces immediately adjacent the edges of the defining walls, drying the mastic until it becomes a pliable solid, chemically stripping the copper plating from the portions of the core not coated by mastic, and peeling the mastic as an integral web from the core to expose the copper plating originally protected by the mastic.

3. The method as described in claim 2 in which the applied coat of mastic comprises as plasticised synthetic resin formulation.

4. The method as described in claim 2 in which the fluent mastic is applied as a plurality of successive coats on top of one another and each coat is dried before the next is applied.

5. A method of selectively plating honeycomb core having a plurality of cells comprising the steps of copper plating the entire surface of the core, applying pliable mastic to the edge areas of the core and the areas within the cells immediately adjacent thereto without sealing said cells, stripping the copper plating where not covered by mastic, and peeling the mastic from the core to expose the plated areas originally protected by the mastic.

6. A method of selectively plating honeycomb core having walls defining a plurality of honeycomb cells which comprises electroplating the entire surface of the core with copper, coating the edges of the walls defining the cells with a fluent mastic without sealing said cells, drying the mastic until it becomes pliable, stripping the plating from the portions of the core not coated by mastic, and peeling the mastic from the core to expose the copper plating originally protected by the mastic.

7. A method of manufacturing an object having plating on selected portions thereof which comprises plating the entire object with a brazing filler metal, masking the selected portions of the object with an adherent, fluent and pliable substance, removing the unmasked portions of the plating from the object, and peeling the masking substance to expose the plating remaining on the selected portions of the object.

8. A method of manufacturing an object having a coating on selected portions thereof which comprises applying a coating of brazing filler metal to the object over an area sufficient to include the selected portions, masking the selected portions by peelable, fluent mastic substance, stripping the unmasked portions of the coating by means incapable of penetrating the masking substance but capable of peeling the coating, and removing the masking substance to expose the coating on the selected areas of the object.

9. A method of coating selected areas of honeycomb core which comprises applying a brazing filler metal coating to the core, masking a portion of the coating with a removable mastic without sealing said core, and stripping the coating from the unmasked portions of the core, thereby leaving the coating on selected areas defined by the mastic.

10. A method of coating selected areas of honeycomb core which comprises coating the entire core with a layer of brazing filler material, masking a portion of the coating with a removable fluent substance without sealing said core, stripping the unmasked portions of the coating from the core, and removing the masking substance to expose the coating on the selected areas originally masked.

References Cited in the file of this patent

UNITED STATES PATENTS

| 2,226,383 | Norris | Dec. 24, 1940 |
| 2,260,893 | Ewing | Oct. 28, 1941 |
| 2,682,501 | Teal | June 29, 1954 |
| 2,758,074 | Black et al. | Aug. 7, 1956 |
| 2,770,033 | Zarth | Nov. 13, 1956 |
| 2,812,295 | Patrick | Nov. 5, 1957 |
| 2,872,391 | Hauser et al. | Feb. 3, 1959 |
| 2,958,928 | Bain et al. | Nov. 8, 1960 |

FOREIGN PATENTS

| 1,116,639 | France | May 9, 1956 |

OTHER REFERENCES

"Printed Circuit Techniques," National Bur. of Standards Circular, 192, U.S.G.P.O., Nov. 22, 1948, pages 51–53.

UNITED STATES PATENT OFFICE
CERTIFICATE OF CORRECTION

Patent No. 3,073,759                                                                  January 15, 1963

Herman R. Wiant

It is hereby certified that error appears in the above numbered patent requiring correction and that the said Letters Patent should read as corrected below.

Column 2, line 42, for "than" read -- that --; column 3, line 11, for "he" read -- the --; line 19, after "manganese" strike out the comma; column 5, line 59, for "as" read -- a --; column 6, line 27, after "by" insert -- a --; line 30, for "peeling" read -- removing --; same line 30, for "removing" read -- peeling --.

Signed and sealed this 20th day of August 1963.

(SEAL)
Attest:

ERNEST W. SWIDER
Attesting Officer

DAVID L. LADD
Commissioner of Patents